ELECTROLUMINESCENT DEVICES AND CIRCUITS

Filed May 15, 1956 3 Sheets-Sheet 1

Inventor:
Richard E. Halsted,
by Paul A. Frank
His Attorney.

May 27, 1958 R. E. HALSTED 2,836,766

ELECTROLUMINESCENT DEVICES AND CIRCUITS

Filed May 15, 1956 3 Sheets-Sheet 2

Inventor:
Richard E. Halsted,
by Paul A. Frank
His Attorney.

ELECTROLUMINESCENT DEVICES AND CIRCUITS

Filed May 15, 1956 3 Sheets-Sheet 3

Inventor:
Richard E. Halsted,
by Paul A. Frank
His Attorney.

United States Patent Office 2,836,766

Patented May 27, 1958

2,836,766

ELECTROLUMINESCENT DEVICES AND CIRCUITS

Richard E. Halsted, Ballston Lake, N. Y., assignor to General Electric Company, a corporation of New York Application May 15, 1956, Serial No. 585,054

22 Claims. (Cl. 315—151)

The present invention relates to electroluminescent devices and circuits therefor. The invention further relates to electroluminescent devices which exhibit a highly frequency-dependent brightness light output, and to electrical circuit arrangements utilizing such frequency dependent characteristics.

Electroluminescence is the process by which certain semi-conducting materials, known as phosphors, emit radiant energy under the primary stimulus of an electrical potential or an electric field. While such radiant energy shall, for the sake of clarity, herein be referred to to as "light," for the purposes of this specification it is to be understood that the term "light" refers to radiation emitted by electroluminescent cells and includes invisible as well as visible light. While there are several different scientific theories presently advanced to explain the mechanism by which electroluminescence occurs, a discussion of these theories is not essential herein. For a further survey of the subject of electroluminescence, reference is hereby made to an article entitled "Electroluminescence and related topics" by Destriau and Ivey in vol. 43, No. 12, December 1955, "Proceedings of the I. R. E.", page 1911.

Electroluminescent light sources are often denominated as luminescent capacitors or electroluminescent cells. Such devices often resemble a flat plate capacitor and may comprise two parallel planar electrodes at least one of which is transparent, separated by a dielectric member which contains, in one form or another, an electroluminescent phosphor. The phosphor may be in the form of microcrystals suspended in a transparent plastic or dielectric binder. Alternatively, the phosphor may be in the form of a continuous, transparent crystalline layer such as that disclosed in U. S. Patent No. 2,709,765 to L. R. Koller, or in the form of single crystals as disclosed in Patent No. 2,721,950 to Piper and Johnson. In general, the microcrystal-in-plastic type of phosphor dielectric exhibits electroluminescence only under excitation by alternating current fields, while the latter two types exhibit electroluminescence when excited by either alternating or unidirectional current fields.

Electroluminescent cells have in the past been utilized as low level light sources and in certain decorative and information portraying uses. Such cells, when including a photoconductive element between the dielectric and one of the electrodes thereof, as disclosed in Patent No. 2,650,310 to W. C. White, have been used as elements of image intensifying screens and light amplifiers. It has been proposed that this combination, utilizing regenerative light feed back between the electroluminescent layer and the photoconductive layer, be utilized as a voltage-triggered bistable storage device or transient voltage indicator.

The magnitude of voltage which should be applied to an electroluminescent cell or luminous capacitor to cause light emission therefrom is generally that potential which establishes a field strength of the order of $10^4$ volts per centimeter across the phosphor dielectric within the cell. Although most electroluminescent cells are relatively thin, the above condition generally requires operating potentials of from 100 to 1000 volts or even higher. It is desirable that electroluminescent cells be capable of operating at much lower applied potentials. Additionally, since the brightness of light emitted from electroluminescent cells is generally a linear function of the frequency of the applied voltage, the usefulness of electroluminescent cells in a number of applications is not as great as it would be if brightness varied sharply with frequency.

When a photoconducting element is included as one element of an electroluminescent device, as is taught by the aforementioned White patent, the resultant device has utility in applications other than as a simple light source. Such devices, however, are two-terminal devices only, and their versatility is limited. Additionally, such devices, when utilized in bi-stable circuits, are responsive to produce bi-stable operation when actuated by two variable parameters only, namely, voltage and light. Furthermore, such devices, having only two terminals, may not be supplied with electrically independent input and output circuits, precluding the generation of an amplified electrical signal thereby when electrical signals are supplied thereto.

Accordingly, one object of the invention is to provide an electroluminescent light source which has a brightness varying highly non-linearly with the voltage applied thereto and operable with source voltages and currents appreciably below the values thereof heretofore used for energization of such light sources.

Still another object of the invention is to provide an electrical circuit having an inherent resonant frequency and which produces electroluminescent light, the brightness of which varies markedly with differences in frequency between the inherent resonant frequency of the circuit and the frequency of an applied electrical signal.

Yet another object of the invention is to provide an electroluminescent signal-translating device having three electrical terminals and incorporating an electroluminescent cell and a photoconductive element.

Still another object of the invention is to provide electroluminescent circuits incorporating such electroluminescent signal-translating devices and responsive in their operation to one or more of the variables of voltage, frequency and light signals.

Still another object of the invention is to provide improved bi-stable electroluminescent signal-translating devices and circuits therefor suitable for use in gating, storage, coincidence, and information storage circuits.

Still another object of the invention is to provide electroluminescent circuits which provide electrical amplification and which utilize as a component thereof, a three terminal electroluminescent signal-translating device incorporating an electroluminescent cell and a photoconductive element.

According to one feature of the invention an electroluminescent cell is electrically connected with other, adjustable circuit components to provide a resonant circuit having an adjustable resonant frequency and which is connected to an input voltage source having an adjustable frequency. The voltage developed across the electrodes of the electroluminescent cell varies non-linearly with frequency, reaching a maximum at the resonant frequency of the circuit. This characteristic in conjunction with the voltage sensitivity of light output from the electroluminescent cell, permits the brightness of light emission therefrom to be varied to a highly non-linear degree by adjusting the frequency of the applied voltage, or alternatively, by adjusting the values of one or more of the resonant circuit components.

According to another feature of the invention the device of such a circuit, and a photoconducting element, each of which is supplied with a respective pair of electrodes, are so placed with respect to each other as to form an electroluminescent signal translating device, useful in multi-terminal electrical circuits for the storage, translation and amplification of information.

The novel features believed characteristic of the invention are set forth in the appended claims. The invention itself, together with further objects and advantages thereof, may best be understood with reference to the following description, taken in connection with the accompanying drawings in which:

Figures 1, 6, 7, 8:
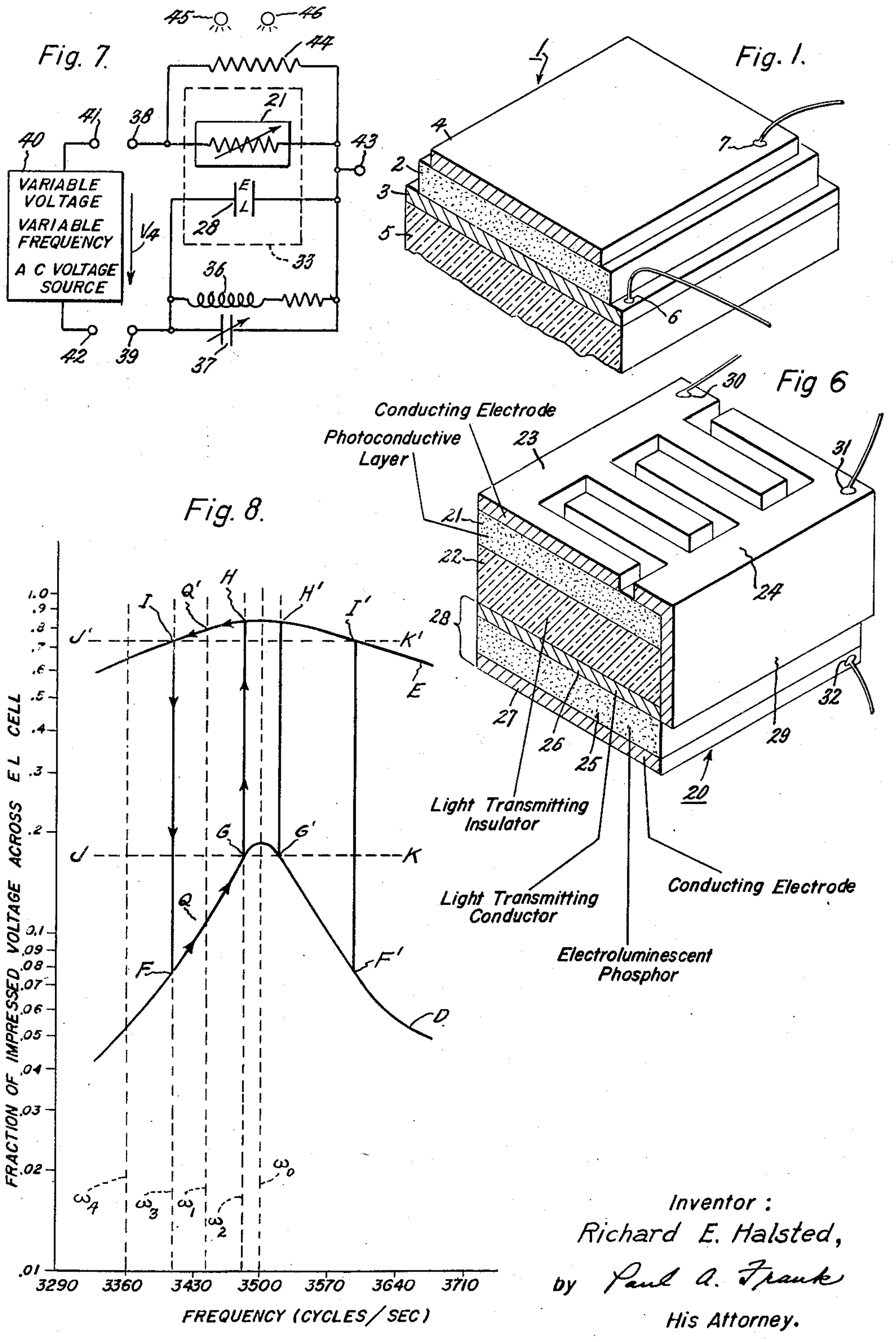
Figure 1 is a partially cut-away perspective view of an electroluminescent cell representative of the devices which may be utilized in the practice of the invention.
Figure 6 is a partially cut-away perspective view of an electroluminescent signal translating device constructed in accord with another feature of the invention.
Figure 7 is a schematic diagram of an electrical circuit embodying the device of Figure 6.
Figure 8 is a graphical presentation of a set of operating characteristics of the circuit of Figure 7.

Figure 1 of the drawing illustrates an electroluminescent cell 1, typical of the devices of known construction which may be utilized in the circuits of the invention, and which comprises a thin layer or film 2 of electroluminescent material in parallel spaced relation with and contacted by a pair of conducting electrodes 3 and 4. The laminated structure so formed is mounted upon an insulating base plate 5 and provided with contacts 6 and 7, connected respectively to electrodes 3 and 4. Electroluminescent layer 2 may be a thin film of a plastic dielectric having embedded therein a dispersed mass of microcrystalline phosphor particles. Conveniently the phosphor may be zinc sulfide activated with about 0.3% by weight of copper, denominated ZnS:0.3 Cu although any other suitable electroluminescent phosphor may be used. Alternatively, layer 2 may be a continuous, homogeneous, crystalline phosphor prepared by the vapor reaction technique as taught by Patent No. 2,675,331 to Cusano and Studer. As a further alternative, layer 2 may comprise a plurality of properly oriented single crystals of phosphor material as taught by U. S. Patent No. 2,721,950 to Piper and Johnson. Conducting layers 3 and 4 are preferably transparent and may comprise sprayed or otherwise deposited layers of tin oxide, known to the art as "conducting glass." Layers 3 and 4 are, however, preferably conducting layers of titanium dioxide which may be prepared and rendered conductive in accord with the teachings of Patent No. 2,717,844, to L. R. Koller. Layer 4, not adjacent to base plate 5 may be non-transparent, in which case it may conveniently comprise a thin, evaporated, sputtered or sprayed layer of a conducting metal such as silver or aluminum. Base plate 5 may be any light transmitting insulating material for example a transparent member which may conveniently be of glass or quartz. Alternatively base plate 5 may be translucent or may be an opaque material perforated with light transmitting apertures.

The simple geometry illustrated in Figure 1 shows the basic elements of an electroluminescent cell. It is apparent, however, that other physical geometries and constituent materials of electroluminescent cells may be utilized in the circuits of the invention and that the cell of Figure 1 is shown by way of example only. As an example of one such change, electrodes 3 and 4 may be replaced by point or line contacts.

Figure 2:
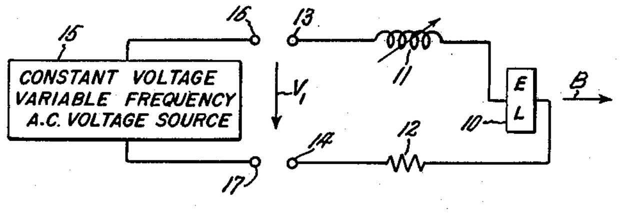
Figure 2 is a schematic circuit diagram of one embodiment of the invention utilizing the device of Figure 1.

Figure 2 illustrates, in schematic, the electrical circuit of a frequency-sensitive electroluminescent light source constructed in accord with the invention. In Figure 2, an electroluminescent cell 10, such as that shown in Figure 1, is connected in series with a variable inductive circuit element 11 between terminals 13 and 14. The inherent resistance of elements 10 and 11 is shown as resistance 12. A variable frequency, constant voltage, alternating voltage source 15 producing a voltage $V_1$, has output terminals 16 and 17. In practice, source 15 comprises a Hewlett-Packard audio-oscillator model #202*d* connected to a McIntosh amplifier model No. 5OW2. This specific example of source 15 is given for illustrative purposes only, and it is to be appreciated that other variable frequency sources may be utilized as well. This source produced an alternating voltage of any preselected and variable audio frequency. In the operation of the circuit, the voltage $V_1$ is applied to terminals 13 and 14 as an input voltage.

The brightness of the emission of an electroluminescent cell has been found to depend upon the frequency and magnitude of the exciting voltage. In general, the brightness varies approximately linearly with frequency and as a power of the applied voltage. The variation may be written, for a limited frequency range, as $$B=KV_c^n$$

where

B is the brightness of the emission of an electroluminescent cell, $V_c$ is the voltage impressed upon the cell, $K$ is a constant of proportionality and, $n$ is a constant, characteristic of the phosphor utilized.

Values of $n$ varying from 1 to 7 have been observed. A reasonable value of 5 taken by way of example, is observable in an electroluminescent cell utilizing plastic-suspended microcrystals of a phosphor comprising 0.3 wt. percent copper activated zinc sulfo-selenide having 80 parts by weight sulfur to 20 parts selenium and denominated as ZnS(80)Se(20):0.3 Cu. The voltage developed across electroluminescent cell 10, as the capacitive element of the series resonant circuit of Figure 2, may be given by the expression, $$V_c=V_1\cdot\frac{1}{WC}\left[R^2+\left(WL-\frac{1}{WC}\right)^2\right]^{-1/2}$$

$$=\frac{V_1}{RW_0C}=V_1Q$$

when $W=(LC)^{-1/2}=W_0$ where $V_c$=the voltage developed across the electroluminescent cell, $V_1$=the input voltage to the circuit, $W$=the angular frequency of the applied voltage, $W_0$=the resonant frequency of the circuit, $R$=the resistance of the circuit, $L$=the inductance of the circuit, $C$=the capacitance of the circuit, $$Q=\frac{1}{RW_0C}$$

an electrical circuit term used as a measure of circuit of frequency selectivity.

In practice, values of Q equaling 50 were readily obtainable from the circuit of Figure 2. Because of the high values of Q which may readily be obtained, it is obvious that the voltage developed between the plates of electroluminescent cell 10, at resonance, is much greater than the voltage applied by voltage source 15. This fact, taken in conjunction with the aforementioned dependence of the brightness of the light emitted by an electroluminescent cell upon the voltage applied thereto, results in a much higher brightness of electroluminescent light emission from electroluminescent cell 10 at the resonant frequency than at other frequencies. Thus, at resonance, the brightness of the electroluminescent cell of Figure 2 may be written as $$B=K\left(\frac{V_1}{RW_0C}\right)^5 \text{ or } B=K(QV_1)^5$$

for a typical phosphor. The circuit of Figure 2, therefore, comprises an electroluminescent light source, the brightness of which is highly dependent upon the frequency of the applied voltage. Furthermore, at the resonant frequency, high brightness electroluminescent light emission may be attained from a relatively low voltage source 15.

Figure 5:
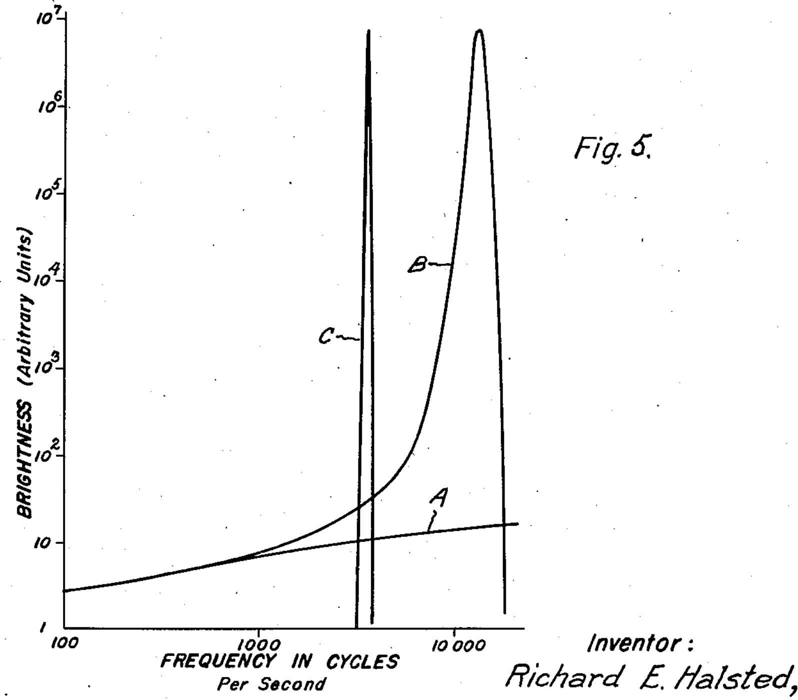
Figure 5 is a graphical representation of the electro-optical characteristics of the circuits of Figures 2 and 3.

The aforementioned advantages of the circuit of Figure 2 may be observed graphically with reference to Figure 5. In Figure 5, curve A represents the brightness characteristics of an electroluminescent cell approximately 1 inch in diameter having a copper activated zinc sulfoselenide phosphor (ZnS(80)Se(20):0.3 Cu) suspended in a transparent dielectric comprising 70 parts by weight of nitrocellulose to 30 parts by weight of a castor oil modified glyceryl-phthalate alkyd resin, as a function of frequency from 100 to 10,000 cycles per second at an applied potential of 30 volts. Curve B of Figure 5 represents the same characteristic for the same electroluminescent cell connected in series with a 200 millihenry inductance, also at 30 volts applied potential. By comparing curves A and B it may be seen that the brightness of the electroluminescent cell connected directly to the voltage source increases only slightly with increasing frequencies and never exceeds 10 arbitrary units. The brightness of the electroluminescent cell connected in the circuit of Figure 2, on the other hand, rises rapidly to a peak of $10^7$ arbitrary units at the resonant frequency, which is far in excess of the brightness of the same cell operated without the resonant circuit. The circuit of Figure 2, therefore, possesses a high "light Q" which, for the purposes of this application, may be defined as $$\frac{W_0}{\Delta W\frac{1}{2}}$$

or the ratio of the resonant frequency to the half height bandwidth on the curves of Figure 5. This circuit, therefore, is well suited as a frequency tuning indicator and as a high-brightness, low-voltage, frequency-sensitive light source. The values of the circuit parameters listed above to attain the curves of Figure 5 are those of one specific example given for illustrative purposes only and are not to be construed in a limiting sense.

In deriving curve B of Figure 5, the frequency-sensitive brightness characteristic was attained with a fixed inductor and the frequency of the voltage source was varied. It will be appreciated that, for different values of inductance, resonance may be attained at a number of preselected frequencies. Additionally, the frequency of the applied voltage may be held constant and the value of circuit inductance varied to produce varying brightness electroluminescent light emission which indicates the magnitude of mechanical or electrical changes which caused the variation in the value of circuit inductance. Thus, for example, a movable tuning slug for inductor 11 may be suitably connected by means of conventional linkages, to a dimension testing probe such as those used to test tolerances on machined items. At the optimum dimension, the circuit is tuned to resonance at the applied frequency. If, however, the tested dimension is oversize or undersize, the tuning slug moves and the inductance changes, detuning the circuit, and sharply reducing the brightness of cell 10. The circuit is then sensitive to coincidence between the applied frequency and the natural resonant frequency of the circuit.

Similarly, the circuit of Figure 2 may be used to indicate electrical as well as mechanical changes. Thus, for example, inductor 11 may be a non-linear inductance as for example one coil of a saturable reactor, another coil of which is connected in a circuit to be monitored and the normal value of its inductance may represent a desired equilibrium condition in the circuit to be monitored. Any change in these conditions results in a change of the inductance of inductor 11, a consequent detuning of the resonant circuit, and sharply reduced brightness light output of cell 10.

Figure 3:
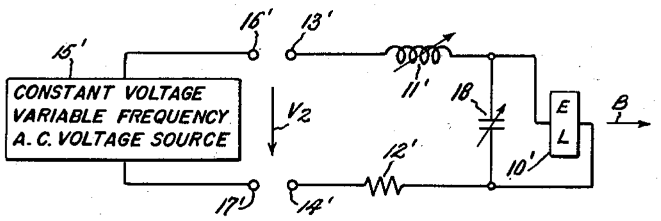
Figures 3 and 4 are schematic circuit diagrams illustrating modifications of the circuit of Figure 2.

In Figure 3, which illustrates a modification of the circuit of Figure 2, an electroluminescent cell 10′ is connected in series circuit relationship with an inductive circuit element 11′ between terminals 13′ and 14′. The resistance of the circuit is shown as a resistance 12′. A variable capacitor 18 is connected in parallel with cell 10′. A variable-frequency, constant-voltage, alternating voltage source 15′ similar to that utilized in Figure 2 is connected to supply a voltage $V_2$ to terminals 16′ and 17′. This voltage is supplied to terminals 13′ and 14′ as an input voltage. The capacitance of an electroluminescent cell varies with the spacing of the electrodes thereof, which is not subject to change for any given cell. The addition of capacitor 18 to the circuit of Figure 3 is particularly advantageous since its presence permits a wide choice of values of total circuit capacitance. This adds versatility to the circuit of Figure 3 and permits the resonant frequency of the circuit to be set at any preselected value to meet the requirements of specific applications. Once a resonant frequency has been chosen, the frequency of variable-frequency, constant-voltage source 15′ may be varied about that value to produce a high "light Q," frequency-sensitive electroluminescent light source which may be used as a frequency tuning indicator or low voltage light source. Alternatively, the frequency of voltage source 15′ may be held constant, and the capacitance of capacitor 18 as well as the inductance of inductor 11′ may be varied by mechanical or electrical means as discussed with respect to the circuit of Figure 2, in which case the brightness of cell 10′ serves as an indicator of circuit detuning.

Curve C of Figure 5 illustrates the high "light Q" of the circuit of Figure 3 utilizing the same cell as was utilized to obtain curves A and B, the same inductance, and a parallel capacitance of 0.01 microfarads. The voltage applied to terminals 13′ and 14′ was reduced to 5 volts as compared to the 30 volt potential utilized in obtaining curves A and B to keep curve C on the same graph as curves A and B. The values used to obtain curve C are given by way of illustration only and are not to be construed in a limiting sense. Curve C exhibits a higher "light Q" due to the use of the parallel capacitance 18 in the circuit of Figure 3. This capacitor has an inherently higher electrical Q than electroluminescent cell 10.

Figure 4:
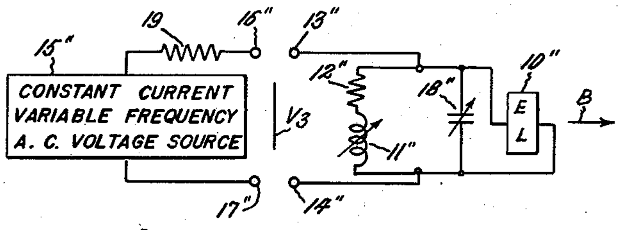

In Figure 4 of the drawing there is shown a further circuit modification. In Figure 4, an electroluminescent cell 10″ and a variable inductive circuit element 11″ are connected in parallel circuit configuration between terminals 13″ and 14″. The resistance of the elements is illustrated as resistance 12″. A capacitive circuit element 18″ is connected in parallel with cell 10″. This circuit configuration is adapted to be utilized with a constant current source or, alternatively, a voltage source 15″ which has a high internal impedance represented as a resistance 19 in series therewith. Voltage source 15″ supplies a voltage $V_3$ to terminals 16″ and 17″. In view of the parallel resonant circuit configuration of electroluminescent cell 10″, and inductive circuit element 11″, this circuit comprises a highly frequency-dependent source of electroluminescent light when energized from a constant current, variable-frequency source 15″. This is in contra-distinction to the circuits of Figures 2 and 3 wherein a highly frequency-dependent electroluminescent light source is provided to operate from a low impedance or constant voltage source. The circuit of Figure 4 of the drawing may be utilized to provide a frequency tuning indicator or an indicator of deviations of a mechanical nature in size or dimension as is described with reference to the circuits of Figures 2 and 3. This circuit also serves as a low current electroluminescent light source.

In the circuit of Figure 4, variable inductance 11″ and variable capacitor 18″ may be varied to select a frequency at which the circuit resonates and at which maximum brightness of electroluminescent light output is obtained. In this case, the frequency of voltage source 15″ is the prime variable which affects the brightness output of electroluminescent cell 10″. Alternatively, the frequency of voltage source 15″ may be maintained constant, and the inductance of variable inductance circuit element 11″ or variable capacitor 18″ may be varied electrically or mechanically in order to tune and detune the circuits.

In Figure 6 there is shown a partially-sectioned perspective view of an electroluminescent signal translating device constructed in accord with another aspect of the invention. In Figure 6, electroluminescent device 20 includes a photoconducting layer 21 deposited upon a light transmitting insulating base member 22 and contacted, in extended area contact, with interleaved interdigital electrodes 23 and 24. A layer 25 of an electroluminescent material is interposed in parallel spaced relation between, and contacted by, conducting electrodes 26 and 27 to form an electroluminescent cell 28. Electroluminescent cell 28 is mounted on the opposite major face of light transmitting insulating base member 22 from photoconducting layer 21 with layer 26 contacting base plate 22. A conducting member 29 extends between interdigital electrode 24 and the conducting electrode 26 adjacent base member 22, connecting photoconductive layer 21 and electroluminescent cell 28 electrically in series, and producing a three-terminal circuit element. Appropriate terminals are connected to electroluminescent device 20. Thus, terminal 30 is connected to interdigital electrode 23, terminal 31 is connected to interdigital electrode 24, and, through conductor 29, to light transmitting conducting electrode 26, and terminal 32 is connected to electrode 27. Terminals 30, 31 and 32 may be extensions of the respective electrodes or may be fastened by conventional means thereto.

Since base member 22 is transmissive of the radiation of electroluminescent cell 28, and photoconductor 21 is a material, the impedance of which changes as a result of such radiation, the two may be said to be in "radiation-coupled relationship." For the purposes of this specification "radiation-coupled relationship" shall be defined as any physical position and geometry which regularly and reproducibly causes the impedance of photoconductor 22 to change as a function of radiation from electroluminescent cell 28. The illustrated structure in which these two elements are arranged in parallel spaced relationship is one example of radiation-coupled relationship.

Base member 22 may be any insulating material which transmits the radiation emitted by electroluminescent layer 25. While member 22 may be translucent, or an opaque member perforated with light transmitting apertures, it is preferably a transparent material, as for instance glass, quartz or mica. The thickness of base member 22 is not critical, but should be as thin as is commensurate with mechanical strength. Conveniently, base plate 22 may be glass and approximately several millimeters thick.

Photoconducting layer 21 may be any material, the electrical resistance of which varies as a function of radiation incident thereon from electroluminescent layer 25. Such materials include, for example, the sulfides, selenides, and tellurides of zinc, cadmium, and lead. Layer 21 may be deposited upon base plate 22 by spraying, evaporating, sputtering, or, if the sulfides or selenides of zinc or cadmium are utilized, layer 21 may be formed according to the method disclosed and claimed in the application of D. A. Cusano, Serial No. 525,159 filed July 29, 1955, now abandoned and assigned to the same assignee as the present invention. In accord with this method, vapors of the metal cation react with a gas containing the anion at the surface of a heated base plate to deposit, by chemical reaction, a thin crystalline continuous homogeneous layer of photoconducting material.

Interdigital electrodes 23 and 24 may comprise thin layers of a metallic conductor such as aluminum or silver deposited by spraying, evaporating or sputtering techniques. Such layers should preferably be thin enough to be light transmitting but, if not light transmitting, should cover a sufficiently small portion of the total exposed surface of photoconducting layer 21 as to allow a major portion of incident light to pass therebetween and to excite layer 21. Alternatively, electrodes 23 and 24 may be transparent conducting films of tin oxide or titanium dioxide. Conducting tin oxide is well known. Conducting transparent layers of titanium dioxide may be formed in accord with the teachings of Patent No. 2,717,844 to L. R. Koller. Conductor 29 may be an extension of interdigital electrode 24 and formed in the same manner. Electrode 26 should be transparent to the emission of electroluminescent layer 25 and may conveniently be a thin conducting layer of tin oxide or titanium dioxide or a transparent evaporated metallic layer as discussed with respect to electrodes 23 and 24.

Electroluminescent layer 25 may be any of the many known electroluminescent phosphors as for example ZnS(80)Se(20):0.3 Cu. Conveniently, layer 25 may be a suspension of microcrystals of electroluminescent material in a light transmitting dielectric material such as nitrocellulose or any other well known light transmitting dielectric, many of which are well known to the art. Alternatively, layer 25 may be a continuous crystalline layer prepared in accord with U. S. Patent 2,675,331 to Cusano and Studer. If such is the case, conducting electrode 26 should be titanium dioxide, which may be prepared in accord with the method of Patent No. 2,732,313 to Cusano and Studer. Conducting electrode 27 need not be transparent for many purposes. In such cases, a metallic layer, sprayed, painted or otherwise applied, may be used. If, however, it is desirable that electrode 27 be transparent, it may be made of tin oxide, titanium dioxide or a thin transparent metallic film as described with respect to interdigital electrodes 23 and 24.

While the above-described structure is illustrative of electroluminescent signal translating devices constructed in accord with the invention, it is apparent that many structural modifications may be made. It is only necessary that an electroluminescent cell and a photoconductive element be intimately disposed in radiation coupled relationship and that each of these elements have a pair of electrodes in contact therewith. The illustrated geometry of Figure 6 in which these elements are substantially in parallel spaced relation is the preferred structure for obtaining this relationship. Additionally, many other materials may be used as the electroluminescent layer and the photoconductive layer. It is only necessary that the electroluminescent layer emit radiation when subjected to voltage excitation, and that the photoconductive layer exhibit a change in resistivity when subjected to the radiation from the electroluminescent layer. The exact choice of materials and geometry are governed by the use for which the device is intended. By proper choice of materials and geometry a wide variation in operating characteristics may be obtained.

One such device similar to that illustrated in Figure 6 had a circular configuration approximately 2½ centimeters in diameter. The base plate comprised a glass wafer 3 millimeters thick. The photoconducting layer was a continuous crystalline film of cadmium sulfide formed by the vapor reaction technique of the aforementioned Cusano application, Serial No. 525,159. The interdigital electrodes were one millimeter wide lines of evaporated aluminum approximately 1 millimeter apart. The transparent electrode adjacent the base plate was a layer of transparent evaporated aluminum approximately 0.25 micron thick. The electroluminescent layer was a suspension of ZnS(80)Se(20) activated with 0.3 wt. percent of copper, suspended in a transparent dielectric comprising 70 parts nitrocellulose by weight to 30 parts of a castor oil modified glyceryl-phthalate alkyd resin. The exterior electrode of the electroluminescent cell (electrode 27) was a 10 micron thick piece of aluminum foil.

Electroluminescent signal translating device 20 as illustrated in Figure 6 and described hereinbefore provides an electroluminescent signal translating device which has many useful applications in computer, logic, and memory circuits. Signals may be applied to and taken from electroluminescent device 20 either electrically or optically. Thus, for example, voltage input signals may be applied to device 20 between terminals 30 and 32 and voltage output signals taken therefrom between terminals 30 and 31. Alternatively, light input signals may be supplied to device 20 by illuminating photoconductive layer 21 through interdigital electrodes 23 and 24, and an optical output may be taken from device 20 by an observation of the state of illumination of electroluminescent cell 28 through transparent conducting electrode 27. This state of illumination may be recorded photographically or may be used to translate electrical signals by activating a photosensitive device closely positioned thereto.

Further obvious advantages of the signal translating device of Figure 6 are derived from its small size and mechanical ruggedness. Furthermore, such devices may readily and inexpensively be produced by mass production techniques. Additionally, although it may be desirable to coat the lateral edge of insulator 22 to prevent the escape of light therefrom, no other precaution, such as evacuation or hermetic sealing, is necessary for efficient operation of the device, as is the case with other signal translating devices.

One distinct feature of the device of Figure 6 which distinguishes it from the devices of the prior art which include layers of photoconductive and electroluminescent materials, is the presence of two separate and distinct electrodes to different surface portions of the photoconductive layer. Because of this feature, the photoconductive layer of the device of Figure 6 exhibits a single characteristic impedance between the two electrodes in contact therewith, for any given level of incident light. The devices of the prior art, having only one electrode in contact with the photoconductive layer, do not exhibit a single characteristic impedance, but rather, a plurality of discrete impedances in accord with the pattern of light falling thereupon. This arrangement is suitable for an image intensifying screen but is not well suited for many of the uses in which the device of Figure 6 has utility.

One illustrative use of the electroluminescent signal translating device of Figure 6 is in the production of a bi-stable circuit having two stable operating conditions. Figure 7 illustrates a bi-stable circuit including electroluminescent signal translating device 20 of Figure 6. In Figure 7, device 20 is indicated by dotted line box 33 which represents the radiation coupling between electroluminescent cell 28 and photoconductive element 21. Electroluminescent cell 28 and photoconductive element 21 are connected in series circuit relationship, while electroluminescent cell 28 is further included in a parallel resonant circuit including inductive circuit element 36 and variable capacitor 37 utilized as a means for varying the total capacitance of the resonant circuit. Although capacitor 37 lends versatility and flexibility to the circuit, its presence is not necessary in the operation of the circuit. Photoconducting element 21 and the parallel resonant circuit including the three aforementioned elements are connected in series circuit relationship between terminals 38 and 39. An alternating current source 40 is connected so as to apply a signal $V_4$, variable in frequency and voltage between circuit contacts 41 and 42. Voltage source 40 may be the oscillator and amplifier described with reference to Figure 2 or, alternatively, may be the output of other electronic circuits in a computer or like device of which this circuit is a part. A voltage output from the circuit may be taken between terminals 38 and 43 across photoconductive element 21 and is represented schematically by load resistance 44.

Positioned within radiation-coupled relationship with photoconductive element 21 are a source of visible light 45 and a source of infra-red light 46 used to trigger and quench, respectively, photoconduction within photoconductive element 21 to trigger the bi-stable circuit of the invention from one stable operating condition to a second stable operating condition. Light sources 45 and 46 may be independent light sources associated with device 33 or may represent the outputs of other circuit stages in an electronic computer or like device of which the circuit of Figure 7 is a part.

The circuit of Figure 7 may be considered an electrical network having five branches or current paths. Thus one branch comprises the path from terminal 38 to terminal 43 through photoconductor 21, while a second branch comprises the path from terminal 43 to terminal 39 through electroluminescent cell 28. A third branch, in parallel with the first branch, exists between terminals 38 and 43 through resistor 44. Fourth and fifth branches exist in parallel with the second branch between terminals 43 and 39 through inductor 36, and capacitor 37, respectively.

The operation of the bi-stable circuit of Figure 7 may best be understood with reference to Figure 8, in which the frequency-sensitive operating characteristics of a circuit constructed in accord therewith and including optional capacitor 37 are presented. In Figure 8 are plotted curves D and E, representing the fraction of the total voltage applied between terminals 38 and 39 in Figure 7 which is developed across electroluminescent cell 28, as a function of the frequency of the applied voltage. Curves D and E are obtained by preventing optical feedback between electroluminescent cell 28 and photoconductive element 21, thus preventing the device from exhibiting bi-stable characteristics. These curves, therefore, are static characteristics, rather than the dynamic operating characteristic, which will be developed therefrom. Curve D represents the variation in the fraction of applied voltage developed across cell 28, in the absence of light feedback, when the resistance of photoconducting element 21 is at its maximum value, representing that condition of operation in which electroluminescent cell 28 is in the non-illuminated condition. As may be seen from curve D, the voltage developed across cell 28 rises as the applied frequency approaches $W_0$, the frequency at which the circuit resonates. This is in accord with the well-known characteristic of a parallel resonant circuit, which exhibits maximum impedance at the resonant frequency. Curve E represents the fraction of the applied voltage between terminals 38 and 39 which is developed across cell 28 when photoconductor 21 exhibits a minimum value of resistance, corresponding to the operating condition in which electroluminescent cell 28 is in the illuminated state, causing a lowering of the resistance of photoconductor 21. Curve E, like curve D, exhibits the characteristics of a parallel resonant circuit by exhibiting a maximum impedance at resonance. This causes a greater fraction of the applied voltage to be developed across cell 28, since the total applied voltage is divided between photoconductor 21 and the resonant circuit, which are electrically in series.

A line JK, horizontally intersecting curve D represents an absolute voltage which, when impressed upon electroluminescent cell 28, is high enough to cause sufficient light emission therefrom to reduce the resistance of photocoductor 21, causing regenerative feedback between these two elements. Such regeneration causes the circuit of Figure 7 to change abruptly from one stable operating condition in which electroluminescent cell 28 is in the nonilluminated condition to a second stable operating condition in which electroluminescent cell 28 is in the illuminated condition. For clarity of presentation line JK is drawn horizontally and its slight frequency dependence derivable from a detailed consideration of the properties of the electroluminescent cell and the photoconductive element, not necessary for an understanding of the invention, is neglected. The indicated position of line JK corresponds to an applied potential between terminals 38 and 39 of 200 volts, an operating potential chosen for illustrative purposes only.

A second horizontal line J'K', intersecting curve E represents the fraction of the applied voltage which, when developed across the electroluminescent cell is just barely sufficient to maintain the electroluminescent cell in the illuminated, or high brightness condition once regeneration between the electroluminescent cell and the photoconductive element has occurred. While it seems anomalous that a higher voltage is necessary to maintain the circuit in the high-brightness stable operating condition than is required to cause this condition, the reason for this seeming anomaly will be apparent when the voltage-triggered bistability of the circuit is discussed later with respect to Figure 10.

For a constant applied operating potential and constant light bias, curves D and E and lines JK and J'K' all remain fixed. Bistable operation is obtained when line JK intersects curve D, and line J'K' intersects curve E. The relative position of line JK and curve D and the relative position of line J'K' and curve E may be changed by varying the absolute value of the voltage applied to terminals 38 and 39 or by varying incident external light, which may be referred to as a "light bias" upon photoconductor 21. It has been noted experimentally that the aforementioned intersections may be caused to exist in the complete absence of external light. Therefore no "light bias" is necessary to properly position a line JK in order to achieve bistable operation from the circuit. It is obvious, however, that bistable operation may not be achieved in the absence of an applied voltage.

In practice, when the fraction of the voltage applied to terminals 38 and 39 which is developed across electroluminescent cell 28 falls below line JK, electroluminescent cell 28 is in a non-illuminated state and the operating point of the circuit falls upon curve D. On the other hand, when the fraction of the applied voltage which is developed across electroluminescent cell 28 is above line J'K' the operating point of the circuit lies upon curve E.

One typical circuit which exhibited the operating characteristics illustrated in Figure 8 was connected as illustrated in Figure 7 and included the specific electroluminescent device described with respect to Figure 6. The photoconductive element of this device had a dark resistance of approximately 100 megohms, and a resistance of approximately 50,000 ohms when the electroluminescent cell was illuminated. Electroluminescent cell 28 exhibited an unilluminated capacity of 0.0005 microfarad. Inductive element 36 had an inductance of 200 millihenries and a resistance of 90 ohms. Capacitor 37 was adjusted to 0.01 microfarad which set the resonant frequency of the circuit at 3500 cycles per second. Resistance 44 had a resistance of approximately 1 megohm. The foregoing values of circuit elements and parameters are given at one specific example of values for purposes of illustration only, and are not to be construed in a limiting sense.

Briefly stated, the bistable circuit of Figure 7 may be caused to change from one stable operating condition to another stable operating condition by variations of one or more of the parameters of frequency and magnitude of the applied voltage, and light incident upon photoconductive element 21 in the following manner.

Assume that a potential of 200 volts having a frequency of 3440 cycles per second or $W_1$ is developed by voltage source 40 and applied to terminals 38 and 39 in Figure 7. At this operating frequency and voltage the quiescent operating point of the circuit is at point Q on curve D. It had been determined experimentally that, for the device utilized, the voltage represented by line JK was 34 volts. The value of the applied voltage and the critical voltage value of 34 volts fixes the position of line JK as shown on Figure 8. The electroluminescent cell is in the non-illuminated condition and 0.11 of the total applied voltage or 22 volts is developed across electroluminescent cell 28, and this value falls below line JK. This value is derived directly from Figure 8 and represents the value of the ordinate at point Q multiplied by the applied voltage of 200 volts.

Assume now that the frequency of source 40 is progressively increased while the magnitude of the applied voltage is maintained constant. As the frequency increases the impedance of the parallel resonant circuit increases, and the operating point progresses from point Q, along curve D toward point G. When the frequency has increased to a frequency of 3480 cycles per second, or $W_2$, the operating point has reached point G on curve D and the voltage developed across electroluminescent cell 28 is equal to 34 volts ($0.17\times$the applied potential of 200 volts) and is sufficient to cause light emission therefrom. This emission reduces the impedance of photoconductive element 21, causing a further increase in the voltage developed across electroluminescent cell 28. Increased voltage across the electroluminescent cell again results in the emission of radiation which further reduces the impedance of the photoconductor. This self-sustaining process is hereinafter referred to as regenerative feedback. When regenerative feedback occurs, lowering the impedance of photoconductive element 21 to its minimal value of approximately 50,000 ohms and increasing the voltage developed across electroluminescent cell 28 to its maximum value, the circuit is transformed from a stable, non-illuminated condition to a stable illuminated condition. The operating point of the circuit then jumps from point G on curve D to point H on curve E. At this point, due to the decrease in photoconductor resistance, a voltage of 163 volts appears across the electroluminescent cell ($0.815\times$the applied potential of 200 volts).

If the frequency of the applied voltage is now decreased from $W_2$ to $W_1$, the operating point of the circuit moves along curve E from point H to point Q'. The frequency and the magnitude of the voltage applied to terminals 25 and 26 are now the same values as were the frequency and applied voltage when the operating point was at point Q on curve D. Since, however, regenerative feedback has occurred in the interim, the operating point of the circuit now resides at point Q' on curve E rather than at point Q on curve D, and the voltage developed across the electroluminescent cell is now 154 volts ($0.770\times200$ volts) rather than 22 volts, as at point Q. Thus it may be seen that the circuit of Figure 7 is truly bistable and may exhibit two stable operating conditions for the same values of the parameters of applied voltage and frequency.

Assume now that the frequency of the voltage applied to terminals 38 and 39 is further decreased from $W_1$ to a value of 3410 cycles or $W_3$, causing the operating point of the circuit to move from point Q' on curve E to point I thereon. When the frequency reaches $W_3$, and the operating point reaches point I, the fraction of the applied voltage which is developed across electroluminescent cell falls to 144 volts, a value insufficient to maintain the brightness of the light output therefrom sufficient to maintain photoconductive element 21 at its minimal resistance value. At this point, in rapid sequence, the resistance of photoconductive element 21 rises, decreasing the fraction of the applied voltage developed across electroluminescent cell 28, further decreasing the light output therefrom. Degeneration thus rapidly occurs, electroluminescent cell 28 ceases to emit, and the value of the resistance of photoconductive element 21 rapidly rises to its maximum value. The operating point of the circuit then falls from point I on curve E to point F on curve D and the circuit has been returned to the low brightness or non-illuminated, stable operating condition. At this point the voltage developed across the electroluminescent cell is 16 volts ($0.08\times200$ volts from Figure 8). If the frequency of the applied voltage is again increased, the operating point progresses along curve D to point Q, but the circuit remains a stable low brightness condition until the applied frequency again reaches the value of $W_2$, at which time the described regeneration occurs, returning the circuit to the illuminated condition. As an aid in tracing the path of the operating point of the circuit with respect to the foregoing description, this path has been indicated by directional-indicating arrows along hysteresis loop FGHI.

While the bistable operation of the circuit has been described with reference to hysteresis loop FGHI on the low frequency side of the resonant frequency $W_0$, it will be appreciated that a similar hysteresis loop F'G'H'I' exists on the high-frequency side of the resonant frequency $W_0$. Such a loop may be followed by varying the applied frequency on the high-frequency side of $W_0$ on Figure 8. It will also be appreciated that the circuit may be changed from the non-illuminated stable condition to the illuminated stable condition and back again to the non-illuminated stable condition by passing through the resonant frequency moving either in the direction of increasing or decreasing frequency.

In accord with the aforementioned description of the bistable operation of circuit of Figure 7 caused by increasing and decreasing the frequency of the applied voltage, it is obvious that the circuit of Figure 7 may be caused to abruptly change from one stable operating condition, at point Q, to a second stable operating condition at point Q' by a brief frequency modulation wherein the frequency of the applied voltage, for a brief period of time, is increased above $W_2$. On the other hand, with the operating point of the circuit located at point Q' on curve E, the circuit may be returned to the original stable condition at point Q by a brief frequency modulation or pulsing which causes the frequency of the applied voltage to momentarily fall below $W_3$, the frequency at which the circuit returns to the non-illuminating condition.

The circuit of Figure 7 may additionally be caused to change abruptly from one stable operating condition to a second stable operating condition by varying either the magnitude of the applied voltage, or external light incident upon photoconductive element 21. Although a more detailed description of voltage triggering of the circuit of Figure 7 is given hereinafter, voltage triggering of the circuit of Figure 7 may be explained substantially as follows:

With the operating point of the circuit located at point Q on curve D of Figure 8 the circuit may be triggered from the non-illuminated stable operating condition to the illuminated stable operation condition by the application of a pulsed positive voltage to terminals 38 and 39 sufficient to cause the voltage across the electroluminescent cell to increase above the critical triggering voltage of 34 volts. On Figure 8, this is equivalent of lowering line JK so that point Q is above the line. This may readily be seen when it is appreciated that the line JK represents the absolute voltage of 34 volts sufficient to cause regeneration. When the voltage applied to terminals 38 and 39 is increased, a lesser fraction of the increased applied voltage must be developed across the electroluminescent cell in order to cause regeneration. Thus with sufficiently increased applied potential, line JK actually falls below point Q, regeneration occurs, and the operating point of the circuit jumps from point Q on curve D to point Q' on curve E. Line J'K' is defined as the fraction of the applied voltage which when developed across the electroluminescent cell is just sufficient to maintain the electroluminceseent cell in the illuminated condition. It is evident therefore that with the operating point at Q', when the relative position of curve E and line J'K' are shifted so that line J'K' is above point Q', degeneration occurs and the operating point of the curve falls back to point Q on curve D and the circuit returns to the original non-illuminated stable operating condition. This condition occurs when the voltage applied to terminals 38 and 39 on Figure 7 is decreased sufficiently to cause a decrease in the brightness of light output of the electroluminescent cell. Such a decrease in the brightness of light output of the electroluminescent cell results in less light impinging upon the photoconductive element, the resistance of which then rises. With the resistance of the photoconductor increasing, the fraction of the total applied voltage which is developed across the electroluminescent cell is reduced. Thus it may be seen that a decrease in the applied voltage causes a lowering of curve E on Figure 8. If the applied voltage is decreased sufficiently, and curve E is lowered a sufficient distance so that point Q' falls below line J'K', degeneration occurs between the electroluminescent cell and the photoconductive element, and the operating point of the circuit falls back to point Q on curve D.

From the foregoing description it may be seen that with the circuit in the stable non-illuminated operating condition the circuit may be triggered into the stable illuminated condition by a pulse of positive voltage applied to terminals 38 and 39 sufficient to lower line JK on Figure 8 below point Q. Furthermore, once the foregoing has occurred and the operating point of the circuit is located at point Q' on curve E, a negative voltage pulse applied to terminals 38 and 39 which is sufficient to lower curve E so that point Q' falls below line J'K' returns the circuit to the stable non-illuminated operating condition.

In similar fashion the same result may be achieved by maintaining the magnitude and frequency of the applied voltage constant and pulsing external light signals incident upon photoconductive element 21. Thus, for example, with the circuit operating at point Q on curve D, curve D may be raised by a pulse of visible light incident upon photoconductive element 21, sufficient to raise curve D so that point Q is above line JK, and abruptly cause regeneration between electroluminescent cell 28 and photoconductor 21, raising the operating point of the circuit to point Q' on curve E. The circuit may then be returned to its original stable operating condition by quenching the photoconduction of photoconductive element 21 by a brief pulse of infra-red light thereupon. This increases its resistance, and causes curve E to fall, so that line J'K' is above point Q'. The circuit then returns to its first mentioned stable operating condition in which electroluminescent cell 34 is non-illuminated.

In the foregoing description it has been shown that two of the parameters of incident light, magnitude and frequency of the voltage applied to the circuit of Figure 7 may be maintained constant and the third parameter varied to change the circuit from one stable operating condition to a second stable operating condition. It has further been shown that this may be accomplished with short pulsings of the varied parameter and that the circuit does not return to its original stable operating condition after the pulse in the varied parameter has passed. Obviously, any one of the parameters may be gated by another parameter, or bistable operation may be obtained by a coincidence of pulses of any two, or all, of the parameters. Thus, for example, an increasing frequency pulse may be applied which, of itself, is insufficient to cause the operating point to change from curve D to curve E, but which, if in coincidence with a pulse of increased voltage, or a pulse of visible light incident upon photoconductive element 28, is sufficient to cause the operating point to change from curve D to curve E. Thus in addition to memory circuits, the circuit of Figure 7 may be utilized as an "and" or an "or" component of a digital computer or a like device. Furthermore, the circuit of Figure 7 may be utilized as an inhibition circuit in which, for example, a frequency pulse which lowers the frequency of the applied voltage to a value of $W_4$ may be applied to prevent the operating point from being shifted from curve D to curve E by a pulse of increasing voltage which, in the absence of the decreased frequency pulse, is sufficient to cause regeneration. Similarly, voltage signals may be used to inhibit either frequency or light pulses and light pulses may be used to inhibit either frequency or voltage pulses.

Figure 9:
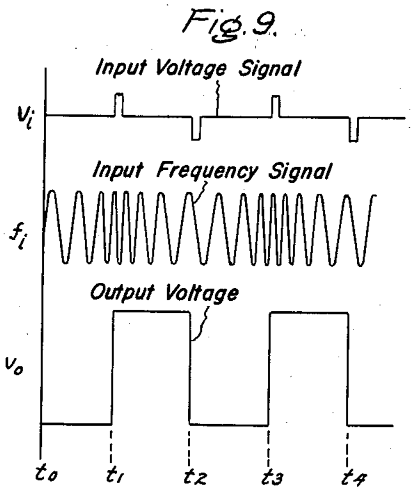
Figure 9 is a graphical presentation of electrical input and output wave forms of the circuit of Figure 7 operating in one mode.

A graphical representation of the operation of the circuit of Figure 7 utilized in this manner to obtain an amplified electrical characteristic by the pulsing of two parameters is presented in Figure 9. In Figure 9, there are shown, in time coincidence, an input voltage $v_1$ having a steady state value of 200 volts, an input frequency $f_1$ having a steady state value of 3440 cycles, and an output voltage $v_0$. The input voltage and frequency signals are applied between terminals 38 and 39 on Figure 7 and the voltage output may conveniently be taken between terminals 39 and 43 on Figure 7. Referring now also to Figure 8, at time $t_0$ the applied frequency and voltage in the unpulsed condition are such as to locate the quiescent operating point of the circuit of Figure 7 at point Q on curve D. At this point the voltage developed across the electroluminescent cell is 22 volts. The input frequency $f_1$ is pulsed in synchronism with the input voltage so that the input frequency pulse causes the operating point to approach point G. At a time $t_1$ the input voltage $v_1$ is pulsed slightly positive, causing line JK on Figure 8 to be depressed slightly, moving the operating point of the circuit to point H on curve E. Only a slight voltage pulse is required, for instance a few volts. Since, however, the voltage across electroluminescent cell 34 rises to a value of 163 volts, a very great increase in voltage is obtained thereacross. This is represented as $v_0$ on Figure 9.

At a time approaching $t_2$ the frequency is pulsed to a low value moving the operating point of the circuit of Figure 7 close to point I on curve E. At time $t_2$ a slightly negative voltage pulse of a few volts is applied to terminals 38 and 39, raising line JK on Figure 8, and causing the operating point of the circuit to fall to point F on curve D. This synchronous pulsing of frequency and voltage is continued, producing the output voltage curve as shown at $v_0$ on Figure 9. From Figure 9 it may be seen that a very small voltage input pulse to terminals 38 and 39 is sufficient to produce, with proper synchronized frequency pulsing, a greatly amplified voltage pulse which continues for a longer time across electroluminescent cell 28. Operating in such a mode, the circuit inherently produces voltage and power gain.

From the foregoing description it would be noted that the circuit of Figure 7, which exhibits bistable characteristics in response to pulsed signals of three different parameters, may be effectively used to perform logic, gating, memory and inhibiting functions. As an element in a more complex memory or logic device information may be "read in" or introduced to the circuit of Figure 7 by causing light pulses to fall upon photoconductive element 21. Information may be "read out" or derived from the circuit optically by noting the condition of illumination of electroluminescent cell 28 either photographically or by a juxtaposed photosensitive element which is in radiation-coupled relationship therewith. Alternatively, information may be derived electrically by noting the magnitude of voltage developed through resistance 44 on Figure 7. The voltage developed across resistance 44 is at a high value when the operating point of the circuit is on curve D, and at a low value when the operating point of the circuit is on curve E of Figure 8.

While the simplified explanation of the voltage triggered operating characteristics of Figure 7 has been given with respect to Figure 8, a detailed discussion of the voltage triggered operation of the circuit of Figure 7 together with the conditions under which amplification may be obtained therefrom requires more detailed analysis. For the purpose of such an analysis the following circuit parameters and notations will be utilized.

$E$=total network input voltage,
$I$=network current,
$V$=voltage across the electroluminescent cell circuit,
$R_p$=resistance of the photoconductor, variable portion,
$R_d$=dark resistance of the photoconductor,
$Z$=impedance of the electroluminescent cell circuit,
$\vec{i}$=unit vector in the direction of current,
$\vec{v}$=unit vector such that $V=|V|.\vec{v}$.

The mathematical analysis of the circuit of Figure 7 may be greatly simplified without introducing appreciable error by the following assumptions.

Let the voltage $V_0$ across the electroluminescent cell be chosen at an arbitrary value such that the absolute value of the impedance of the electroluminescent cell circuit is equal to the variable portion of the resistance of the photoconductive element. Thus $$R_p=|Z| \quad (1)$$

Let the brightness of the electroluminescent cell be expressed by the equation $$B=K_1|V|^n \quad (2)$$

This assumption is in accord with electroluminescent literature and is well known to the art.

Let is further be assumed that the resistance of the photoconductor varies with emission from the electroluminescent cell in accord with the relation $$R_p=\frac{K_2}{B^m} \quad (3)$$

where $K_2$ is a constant of proportionality, and $m$ is a constant depending upon the photoconductor utilized.

In the literature, $m$ is frequently assumed to be equal to 1. Literature references, however, also indicate that $m$ may vary from 0.5 to 1.5.

Combining the above equations we find that $$R_p=\frac{K_2}{K_1^m|V|^{nm}}=\frac{K}{|V|^{nm}} \quad (4)$$

As noted above, $V_0$ was chosen as an arbitrary reference voltage so that $$|Z|=R_p=\frac{K}{|V_0|^{nm}} \quad (5)$$

from which $$K=|Z|\ |V_0|^{nm} \quad (6)$$

and $$R_p=|Z|\left|\frac{V_0}{V}\right|^{nm} \quad (7)$$

the loop equation for Figure 7 may then be written $$\vec{E}=\vec{V}+\frac{IR_vR_d}{R_v+R_d}\vec{i}$$

$$=\vec{V}+\frac{I|Z|\left|\frac{V_0}{V}\right|^{nm}R_d}{|Z|\left|\frac{V_0}{V}\right|^{nm}+R_d}\vec{i}$$

therefore $$\frac{\vec{E}}{V_0}=\left|\frac{V}{V_0}\right|\left[\vec{v}+\frac{\left|\frac{V_0}{V}\right|^{nm}\frac{R_d}{|Z|}}{\left|\frac{V_0}{V}\right|^{nm}+\frac{R_d}{|Z|}}\vec{i}\right] \qquad (8)$$

The above equation is a very close approximation to the operating characteristics of the circuit of Figure 7 in terms of input voltage E and output voltage V, considering the input voltage to be the voltage applied between terminals 38 and 39 and the output voltage to be the voltage developed across the electroluminescent cell.

Figure 10:
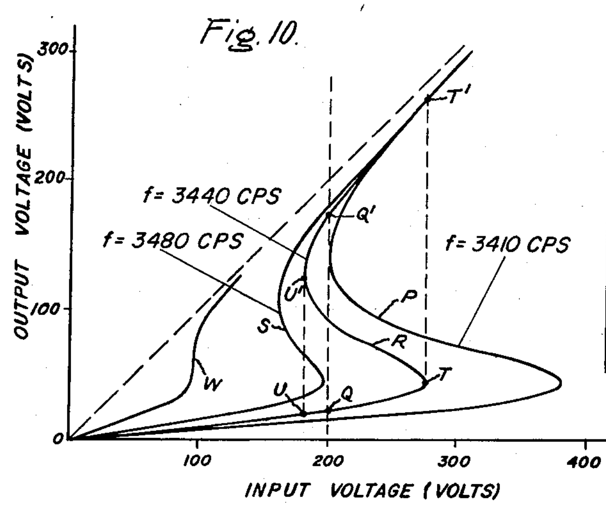
Figure 10 is a graphical presentation of another set of operating characteristics of the circuit of Figure 7.

Figure 10 illustrates the voltage operating characteristics of the circuit of Figure 7 for operating frequencies of 3480 cycles per second, 3440 cycles per second and 3410 cycles per second, represented by curves S, R and P respectively. These characteristics are plotted for the values of circuit parameters listed hereinbefore in the specific example of the circuit of Figure 7. Additionally:

$V_0$=110 volts at 3440 c. p. s.
=124 volts at 3410 c. p. s.
=91 volts at 3480 c. p. s.

Once one of the above values of $V_0$ is selected, the remaining two may be calculated from Equation 5

$\frac{R_d}{Z}$=13 at 3410 c. p. s.
=9 at 3440 c. p. s.
=6 at 3480 c. p. s.

The above values are derived from curve D of Figure 8.

$nm$=3. for the electroluminescent cell and photoconductive element utilized.

In Figure 10, the dotted diagonal line running through the origin is indicative of an equivalency between input and output voltages.

Since the bistable operation of the circuit of Figure 7 in response to voltage triggering is essentially the same in principle at different operating frequencies, although responsive to different operating voltages, the voltage-triggered bi-stability of the circuit will be discussed with respect to curve R of Figure 10. Points Q and Q′ on curve R correspond to points Q and Q′ on curves D and E respectively of Figure 8. These two points indicate two stable operating points at which the circuit of Figure 7 may operate for the same applied voltage and frequency.

Assume that the voltage applied between terminals 38 and 39 on Figure 7 is 200 volts. The operating condition of the circuit with the electroluminescent cell not illuminated is located on point Q of curve R. The electroluminescent cell remains non-illuminated and the circuit remains in the stable non-illuminated operating condition until the voltage applied to terminals 38 and 39 is increased to a value of 278 volts. When this occurs, the operating point of the circuit moves to the first inflection point T on curve R and a voltage of 44 volts is developed across the electroluminescent cell. Regeneration then occurs between the electroluminescent cell and the photoconductive element and the operating point of the circuit jumps from point T to point T′ on curve R at which time the voltage developed across the electroluminescent cell equals 263 volts. If the voltage applied between terminals 38 and 39 is then decreased to the original value of 200 volts, the operating point of the circuit moves along curve R from point T′ to point Q′. With the values of applied voltage and frequency now at the same values as as they were before regenerations occurred, the operating point of the circuit is now at point Q′. At this point the output voltage developed across the electroluminescent cell equals 170 volts, as compared to the voltage of 22 volts at point Q. Thus for the same values of applied voltage and frequency, there are two stable operating points for the circuit of Figure 7.

If, now, the applied voltage is reduced to 183 volts the operating point of the circuit falls to point U′ on curve R which is an inflection point, at which time the voltage across the electroluminescent cell falls to 125 volts, and degeneration sets in. The operating point of the circuit then falls to point U on curve R and the circuit is returned to its original stable operating condition with the electroluminescent cell in a non-illuminated condition. From a consideration of the curves of Figure 10, it is apparent that the operating characteristics of the circuit require that the voltage across the electroluminescent cell (the output voltage) at which degeneration occurs must necessarily be much greater than the voltage thereacross at which regeneration occurs.

When the circuit of Figure 7 is in the stable operating condition such that the electroluminescent cell is illuminated, as, for example, at any point along curve R from U to T′, it may be seen that the circuit is operating along a line having a slope which is greater than 1. This indicates that the change in output voltage is greater than the corresponding change in input voltage and the circuit exhibits amplification. Voltage amplification may further be derived from the circuit by adjusting the value of the quantity $$\left|\frac{R_d}{Z}\right|$$

so that this quantity is less than 3. When this condition is met, the circuit does not exhibit bistable operation but, however, the output voltage taken across the electroluminescent cell varies as a single-valued function of the input voltage applied to terminals 38 and 39 on Figure 7. Curve W on Figure 10 illustrates such a single value voltage characteristic for the circuit of Figure 7 in which the value of $$\frac{R_d}{Z}$$

is equal to 3. As may be seen from curve W of Figure 10, there is no region of bistability on the operating characteristics of the circuit. In place of bistability, there is however, a single-valued relationship between input voltage and output voltage which produces amplification. This is evident from the fact that the slope of curve W is greater than 1 over a large part of the curve. Thus by properly adjusting the relative dark impedance of the photoconductor and the impedance of the electroluminescent cell circuit, voltage amplification is attained from the circuit of Figure 7.

The electrical amplification characteristics of the circuit of the invention may be better understood by considering the circuit of Figure 7 operating at a constant frequency. With the circuit operating at a constant frequency the presence of a frequency sensitive circuit is unnecesary. Accordingly, with the circuit of Figure 7 operated at a constant frequency, the resonant circuit may be omitted or replaced by a frequency insensitive impedance, such as a simple resistor. For clarity of presentation the circuit of Figure 7 has been simplified in Figure 11 for operation at a constant frequency.

Figure 11:
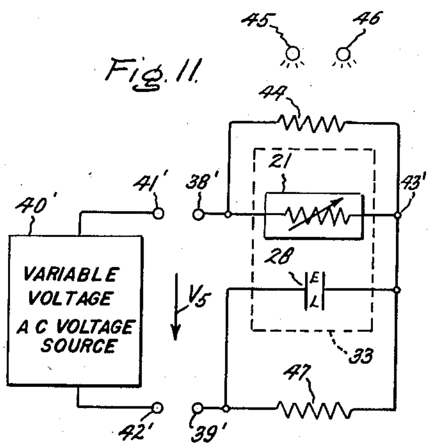
Figure 11 is a schematic circuit diagram representing the circuit of Figure 7 simplified for constant frequency operation.

In Figure 11 a variable voltage, constant frequency, alternating voltage source 40′ is connected to supply a voltage $V_5$ betwen terminals 41′ and 42′. An electroluminescent signal translating device as illustrated in Figure 6 of the drawing is indicated by dotted line block 33 and includes electroluminescent cell 34 and photo-conductive element 21 in series circuit relationship and in radiation-coupled relationship. A resistive circuit element 44 is connected in parallel circuit relationship with photoconductive element 21 between terminals 38' and 43'. The output of voltage source 40' is supplied to terminals 38' and 39' as an input voltage. An output voltage is taken across a substantially infinite load resistance 47 connected in parallel with electroluminescent cell 28. As an alternative method to taking a voltage output across electroluminescent cell 28, resistive element 47 may be omitted, and the light output of electroluminescent cell 28 may be monitored by a photoconductive element or other photosensitive device.

Figure 12:
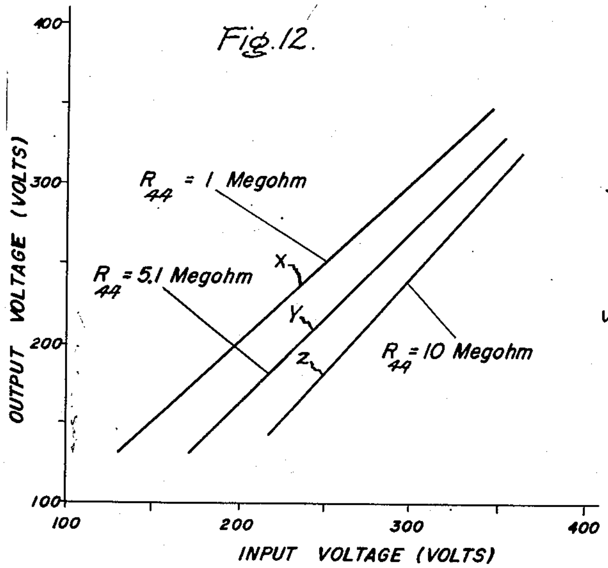
Figure 12 is a graphical presentation of the voltage amplifying characteristics of the circuit of Figure 11.

In Figure 12 of the drawing are illustrated the operating characteristics of the circuit of Figure 11 utilizing various values for shunt resistance 44 in parallel with photoconductive element 21. All of the curves of Figure 11 were taken at an operating frequency of 50 cycles per second. In Figure 12 curve X represents the dependence of the voltage across electroluminescent cell 28 upon the voltage applied between input terminals 38' and 39' with a one-megohm resistance 44 in parallel with photoconductive element 21. Since the dark resistance of photoconductive element 35 is approximately 100 megohms, practically all of the voltage impressed upon the entire circuit is impressed across electroluminescent cell 28 and the slope of curve W is approximately 1.0, representing no voltage gain. Curve Y of Figure 11 represents the voltage developed across electroluminescent cell 28 as a function of the voltage applied between input terminals 38' and 39' with a 5.1-meghom resistance 44 in parallel with photoconductive element 21. The slope of curve Y is slightly more postive than that of curve X and has a value of 1.10 indicating voltage gain. Curve Z on Figure 11 represents the voltage developed across electroluminescent cell 28 as a function of input voltage applied between terminals 38 and 39 with a 10-megohm resistance 44 in parallel with photoconductive element 21. The slope of curve Z has a value of 1.22 indicating a still greater voltage gain than obtained from curve Y.

Thus it may be seen that by properly selecting the circuit parameters of the circuit of Figure 10, voltage gain may be realized. This voltage gain is realized due to the controlled regeneration between electroluminescent cell 28 and photoconductive element 21. With this regeneration properly controlled by selection of the value of parallel resistance 44 so that complete regeneration between photoconductive element 21 and electroluminescent cell 34 is not realized the circuit exhibits, rather than bistability, a single-valued voltage output which is an amplified image of the voltage impressed upon the circuit. Curves X, Y and Z were taken from the circuit of Figure 11, with which the applied voltage was varied as indicated, and photoconductive element 21 and electroluminescent cell 28 comprised the device described with reference to Figure 6 of the drawing. In this example photoconductive element 21 had a dark resistance of approximately 100 megohms and electroluminescent cell 28 had a capacitance of approximately 500 micro-micro-farads.

Consider the parallel resistance of resistor 44 and photoconductor 21 as a resistance R and the impedance of electroluminescent cell 28 and any component in parallel therewith as an impedance Z supplied with a voltage V between terminals 38 and 39. Assume that a change in voltage ΔV is applied between terminals 38 and 39 and that this change causes a change in the resistance R of ΔR. It may be shown analytically that the circuit exhibits voltage amplification, that is $$\infty > \frac{\Delta V_Z}{\Delta V} > 1$$

if $$\left|R+Z\right|\Delta\frac{V_Z}{V_Z}\left|\Delta R\right| > R\Delta\frac{V_Z}{V_Z}$$

Since ΔR depends upon the choice of the value of resistance 44 the circuit may be made to exhibit voltage amplification by a choice of the value of resistance 44 so that the above condition exists. Although resistance 44 is herein connected in parallel with photoconductor 21 to control ΔR, it will be appreciated that this resistance could alternatively be connected in series with photoconductor 21 to accomplish the same effect.

Since the brightness of light emitted by electroluminescent cell 28 depends primarily upon the voltage developed thereacross it is evident from the curves of Figure 11, particularly curves Y and Z, that a higher rate of change of brightness of light output with changing voltage may be secured from electroluminescent cell 28 with a proper selection of the value of shunt resistance 44 than can be attained using only an electroluminescent cell. This results in a highly non-linear brightness versus voltage characteristics which has marked utility in many applications such as, for instance, in a cross grid image presentation system such as that described and claimed in U. S. Patent No. 2,698,915 to W. W. Piper wherein it is desirable that a high brightness light output be achieved at the connected intersecting grids of such a system.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A frequency sensitive electroluminescent circuit comprising a pair of input terminals, an inductive circuit element and a capacitive network including an electroluminescent cell connected in electrical circuit relationship between said terminals and having reactance values adjustable for resonance at a first frequency, a source of alternating voltage connected to said input terminals and impressing an alternating voltage having a second variable frequency across said inductive circuit element and said capacitive network, and means for varying one of said frequencies relative to the other of said frequencies.

2. A frequency sensitive electroluminescent circuit comprising a pair of input terminals, an inductive circuit element and a capacitive network including an electroluminescent cell connected in electrical series circuit relationship between said terminals and having reactance values adjustable for resonance at a first frequency, a source of alternating voltage connected to said input terminals and impressing an alternating voltage having a second variable frequency across said inductive circuit element and said capacitive network, and means for varying one of said frequencies relative to the other of said frequencies.

3. The circuit of claim 1 wherein the means for adjusting one of said frequencies relative to the other of said frequencies comprises means for adjusting the frequency of said alternating voltage source.

4. A frequency sensitive electroluminescent circuit comprising a pair of input terminals, an inductive circuit element and a capacitive network including an electroluminescent cell and a capacitive circuit element in parallel therewith connected in electrical circuit relationship between said terminals and having reactance values adjustable for resonance at a first frequency, a source of alternating voltage connected to said input terminals and impressing an alternating voltage having a second variable frequency across said inductive circuit element and said capacitive network, and means for varying one of said frequencies relative to the other of said frequencies.

5. A frequency responsive circuit comprising a pair of input terminals, an electroluminescent cell and a variable impedance circuit element connected in electrical circuit relationship between said terminals, and means connected to said terminals and impressing an alternating voltage across said variable impedance element and said electroluminescent cell.

6. A frequency responsive circuit comprising a first pair of terminals, an electroluminescent cell having a second pair of terminals and a variable impedance element having a third pair of terminals connected electrically in series and in radiation coupled relationship between said first pair of terminals, and means connected to said first pair of terminals and impressing an alternating voltage across said variable impedance element and said electroluminescent cell.

7. A frequency responsive circuit comprising a first pair of terminals, an electroluminescent cell having a second pair of terminals and an impedance element having a third pair of terminals connected in electrical circuit relationship between said first pair of terminals, and means connected to said first pair of terminals and impressing a variable frequency alternating voltage across said impedance element and said electroluminescent cell.

8. A frequency responsive circuit comprising a first pair of terminals, an electroluminescent cell having a second pair of terminals and a variable impedance element comprising a photoconductive element and having a third pair of terminals connected electrically in series and in radiation coupled relationship between said first pair of terminals, and means connected to said first pair of terminals and impressing a variable frequency alternating voltage source across said impedance element and said electroluminescent cell.

9. An electroluminescent device comprising an electroluminescent capacitor, said capacitor including a dielectric member comprising an electroluminescent phosphor and a pair of electrodes contacting spaced surface regions of said member, a photoconductive member having an impedance which varies as a function of radiation emitted from said electroluminescent phosphor positioned in spaced relationship and in radiation coupled relationship with said electroluminescent capacitor, and a pair of electrodes contacting spaced surface regions of said photoconductive member.

10. An electroluminescent device comprising an electroluminescent capacitor, said capacitor including a dielectric layer comprising an electroluminescent phosphor and a first pair of conducting electrodes in extended area contact with spaced surface regions of said dielectric layer, a photoconductive member having an impedance which varies as a function of radiation emitted from said electroluminescent phosphor positioned in spaced relation and in radiation coupled relation with said electroluminescent capacitor, and a second pair of conducting electrodes in extended area contact with spaced surface regions of said photoconductive member.

11. An electroluminescent device comprising a first layer comprising an electroluminescent phosphor, a second layer comprising a photoconducting element having an electrical impedance which varies as a function of light emitted by said electroluminescent layer, said electroluminescent layer and said photoconducting layer being positioned in spaced relation and in radiation coupled relationship, a first electrode contacting a first surface region of said electroluminescent layer, a second electrode contacting a first surface region of said photoconducting layer, and transparent conducting means contacting a second opposed surface region of said electroluminescent layer and a second surface region of said photoconducting layer.

12. An electroluminescent device comprising a light transmitting base plate, an electroluminescent capacitor mounted on one major surface of said base plate and including a dielectric member comprising an electroluminescent phosphor and a first pair of conducting electrodes at least one of which is light transmitting contacting opposite surfaces of said dielectric member, a photoconductive member having an electrical impedance which varies as a function of radiation emitted from said phosphor mounted on the opposite major surface of said base plate, and a second pair of conducting electrodes contacting spaced surface regions of said photoconducting member.

13. The device of claim 10 in which the second pair of electrodes comprise interdigital electrodes with interleaved finger members.

14. The device of claim 10 in which one of said first pair of electrodes is electrically connected to one of said second pair of electrodes to provide a three terminal circuit element.

15. In combination with the device of claim 10, an electrical connection between one of said first pair of electrodes and one of said second pair of electrodes, an inductive circuit element connected between said first pair of electrodes, a resistive circuit element connected between said second pair of electrodes, and means for supplying electrical signals between the unconnected one of said first pair of electrodes and the unconnected one of said second pair of electrodes.

16. In combination with the device of claim 10, an electrical connection between one of said first pair of electrodes and one of said second pair of electrodes, an inductive circuit element and a capacitive circuit element connected in parallel between said first pair of electrodes, a resistive circuit element connected between said second pair of electrodes, and means for supplying electrical signals between the unconnected one of said first pair of electrodes and the unconnected one of said second pair of electrodes.

17. An electroluminescent information translating circuit comprising an electroluminescent device including a thin transparent base plate, an electroluminescent capacitor mounted on one major surface of said base plate and including a dielectric member comprising an electroluminescent phosphor and a first pair of conducting electrodes at least one of which is transparent contacting opposite surfaces of said dielectric member, a photo-conductive member having an electrical impedance which varies as a function of radiation emitted from said phosphor mounted on the opposite major surface of said base plate, a second pair of conducting electrodes contacting spaced surface regions of said photoconductive member, one of said second pair of electrodes contacting the one of said first pair of conducting electrodes which is disposed between the electroluminescent phosphor and the transparent base plate rendering said electroluminescent cell and said photoconductive member electrically in series, an inductive circuit element connected in parallel circuit relationship with said electroluminescent cell, and means for applying input electrical signals to said circuit.

18. An electroluminescent signal translating circuit comprising an electroluminescent cell and a photoconductive element in series circuit relationship and in radiation coupled relationship, the impedance of said photoconductive element exhibiting a marked variation as a function of radiation emitted from said electroluminescent cell, an inductive circuit element connected in parallel circuit relationship with said electroluminescent cell providing a parallel resonant circuit therewith at a predetermined frequency and means for applying input electrical signals to said circuit.

19. An electrical network having at least two branches, one end of each branch being connected to a common terminal point, each of said branches containing an electrical impedance element, the circuit element in one of said branches comprising an electroluminescent cell, the circuit element in another of said branches comprising a photoconductive element, the electrical impedance of which varies as a function of radiation emitted by said electroluminescent cell, said electroluminescent cell and said photoconductive element being positioned in spaced relation and in radiation coupled relationship.

20. An electrical network having three branches, one end of each branch being connected to a common terminal point, each of said branches containing an electrical impedance element, the circuit element in one of said branches comprising an electroluminescent cell, the circuit element in another of said branches comprising photoconductive element, the electrical impedance of which varies as a function of radiation emitted by said electroluminescent cell, the circuit element in a third of said branches comprising an inductive circuit element, said electroluminescent cell and said photoconductive element being positioned in spaced relation and in radiation coupled relationship.

21. An electrical network having three branches, one end of each branch being connected to a common terminal point, each of said branches containing an electrical impedance element, the circuit element in one of said branches comprising an electroluminescent cell, the circuit element in another of said branches comprising a photo-conductive element, the electrical impedance of which varies as a function of radiation emitted from said electroluminescent cell, the circuit element in a third of said branches comprising a load device, the voltage developed across said load device varying as a function of the electrical impedance of said photoconductive element, said electroluminescent cell and said photoconductive element being positioned in spaced relation and in radiation coupled relationship.

22. An electrical circuit comprising a network having three branches, one terminal of each branch being connected to a common terminal point, each of said branches containing an electrical impedance element, the circuit element in one of said branches comprising an electroluminescent cell, the circuit element in another of said branches comprising a photoconductive element, the electrical impedance of which varies as a function of radiation emitted from said electroluminescent cell, said electroluminescent cell and said photoconductive element being positioned in spaced relation and in radiation coupled relationship, the radiation from said electroluminescent cell being of low brightness when said circuit is in one stable operating condition, and of high brightness when said circuit is another stable operating condition.

References Cited in the file of this patent

UNITED STATES PATENTS 2,694,785 Williams -------------- Nov. 16, 1954

Notice of Adverse Decision in Interference

In Interference No. 92,114 involving Patent No. 2,836,766, R. E. Halstead, Electroluminescent devices and circuits, final judgment adverse to the patentee was rendered Sept. 1, 1964, as to claims 7, 8 and 12.

[*Official Gazette October 27, 1964.*]